(12) United States Patent
Rosenberg

(10) Patent No.: US 8,156,168 B2
(45) Date of Patent: Apr. 10, 2012

(54) METHOD AND SYSTEM FOR DATA SECURITY

(75) Inventor: Burton J. Rosenberg, Coral Gables, FL (US)

(73) Assignee: University of Miami, Miami, FL (US)

( * ) Notice: Subject to any disclaimer, the term of this patent is extended or adjusted under 35 U.S.C. 154(b) by 1272 days.

(21) Appl. No.: 11/839,909

(22) Filed: Aug. 16, 2007

(65) Prior Publication Data
US 2008/0046493 A1 Feb. 21, 2008

Related U.S. Application Data

(60) Provisional application No. 60/838,220, filed on Aug. 17, 2006.

(51) Int. Cl.
*G06F 1/02* (2006.01)
*G06F 7/58* (2006.01)

(52) U.S. Cl. ........................................ 708/250; 713/153

(58) Field of Classification Search .................. 708/250; 713/153
See application file for complete search history.

(56) References Cited

U.S. PATENT DOCUMENTS

| | | | | |
|---|---|---|---|---|
| 5,485,474 A * | 1/1996 | Rabin | ........................... | 714/762 |
| 7,391,865 B2 * | 6/2008 | Orsini et al. | ................... | 380/201 |
| 2002/0143710 A1 * | 10/2002 | Liu | ................................ | 705/75 |
| 2005/0139657 A1 * | 6/2005 | Hopkins | .................... | 235/382.5 |
| 2008/0137857 A1 * | 6/2008 | Bellare et al. | ................. | 380/255 |

OTHER PUBLICATIONS

Ben-Or, Michael, et al.; "Completeness Theorems for Non-Cryptographic Fault-Tolerant Distributed Computation"; Association for Computing Machinery Symposium on Theory of Computing; 1998, pp. 1-10.
Cachin, Christian; "Research in security in Networked storage systems"; http://www.zurich.ibm.com/~cca/research.html; Jun. 28, 2005.
Shamir, Adi; "How to Share a Secret"; Communications of the Association for Computer Machinery; Nov. 1979, vol. 22, pp. 612-613.
Trouessin, Gilles, et al.; "Improvement of data processing security by means of default security by means of fault tolerance"; Fourteenth National Computer Security Conference; 1991, pp. 295-304.

* cited by examiner

*Primary Examiner* — Lewis A Bullock, Jr.
*Assistant Examiner* — Kevin G Hughes
(74) *Attorney, Agent, or Firm* — Christopher & Weisberg, P.A.

(57) ABSTRACT

A method, system and apparatus that advantageously provide a security protocol for data security. The apparatus includes a random number generator for generating random numbers and a share calculator in communication with the random number generator, the share calculator processes the data to generate one or more encoded data shares where the processing is based at least in part on the random numbers. The apparatus may further include a router that routes the encoded data shares, a switching fabric and associated logic. The data security system includes one or more storage devices that store client data and a splitter that controls access to the client data stored on the one or more storage devices where the splitter apparatus encodes at least a portion of the client data that is stored on the one or more storage devices.

14 Claims, 3 Drawing Sheets

METHOD AND SYSTEM FOR DATA SECURITY

CROSS-REFERENCE TO RELATED APPLICATION

This application is related to and claims priority to U.S. Provisional Application No. 60/838,220, filed Aug. 17, 2006, entitled METHOD AND SYSTEM FOR DATA SECURITY, the entirety of which is incorporated herein by reference.

STATEMENT REGARDING FEDERALLY SPONSORED RESEARCH OR DEVELOPMENT n/a

FIELD OF THE INVENTION

The present invention relates to data security. More particularly, the invention relates to a method and system for keyless data security.

BACKGROUND OF THE INVENTION

Computers are connected to storage devices such as disks, tapes, and disk arrays by local busses such as Small Computer Interface ("SCSI") or by network protocols such as Fibre Channel or SCSI over IP ("iSCSI"). Such connections use packet-based protocols to send data, commands, and status information between computers and storage devices. The data stored on such storage devices is often of a proprietary nature, and the owner of such data desires to prevent unauthorized users from reading or modifying the data.

In the case of networked computer storage, unauthorized users can in many cases gain access to the data stored in such devices. However, it is important to provide data security against a wide spectrum of unknown attacks by providing a system that prevents unauthorized users from understanding the data.

One current way to secure the confidentiality of data on disks and backup media is to encrypt the data using a key. However, this solution requires a key whose use and retention must be tightly controlled, and thus transfers the security problem from the data to the key. Although generally recognized as an improvement, experience shows that the use of keys can be cumbersome and can lack true security, for example, it still allows for insider attacks by people who have legitimate access to the key but who are not trustworthy.

It would be advantageous if such a system could enable data confidentiality against unauthorized users while operating in a completely transparent fashion so that no modification is required to either the computers or the storage devices, which would simplify the integration of such a device with a plurality of computers and storage devices, and require no management of secret keys with their attendant vulnerabilities, costs and complications.

SUMMARY OF THE INVENTION

In one embodiment, an apparatus for data security in a system includes a random number generator for generating random numbers and a share calculator in communication with the random number generator, the share calculator processes the data to generate one or more encoded data shares where the processing is based at least in part on the random numbers. The apparatus further includes a router that routes the encoded data shares.

In another embodiment, a data security system includes one or more storage devices that store client data and a splitter that controls access to the client data stored on the one or more storage devices where the splitter apparatus encodes at least a portion of the client data that is stored on the one or more storage devices.

In yet another embodiment, the method for securing data in storage devices on a network that includes generating at least one random number, processing at least a portion of the data to generate encoded data shares where the processing is based at least in part on at least one random number and storing the encoded data shares in a plurality of data storage devices. The method for securing data in storage devices further includes decoding the at least a portion of the client data.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein like designations refer to like elements, and wherein.

DETAILED DESCRIPTION OF THE INVENTION

A method, system and apparatus that provide transparent encryption, integrity and compression for files (or other file-related datasets) in primary, nearline and secondary storage environments. The system and apparatus may be used, for example, to backup and restore applications, in primary storage environments, and nearline storage environments, which provide a high-performance staging area for backup applications. The invention may be delivered as a hardened security apparatus, which transparently intercepts file protocol control, and data streams, e.g., as a directed or transparent proxy and applies security policies to datasets that are being transferred. The invention uses deep inspection of the file protocols to perform on-the-fly secret sharing, splitting and switching operations on the data.

Figure 1:
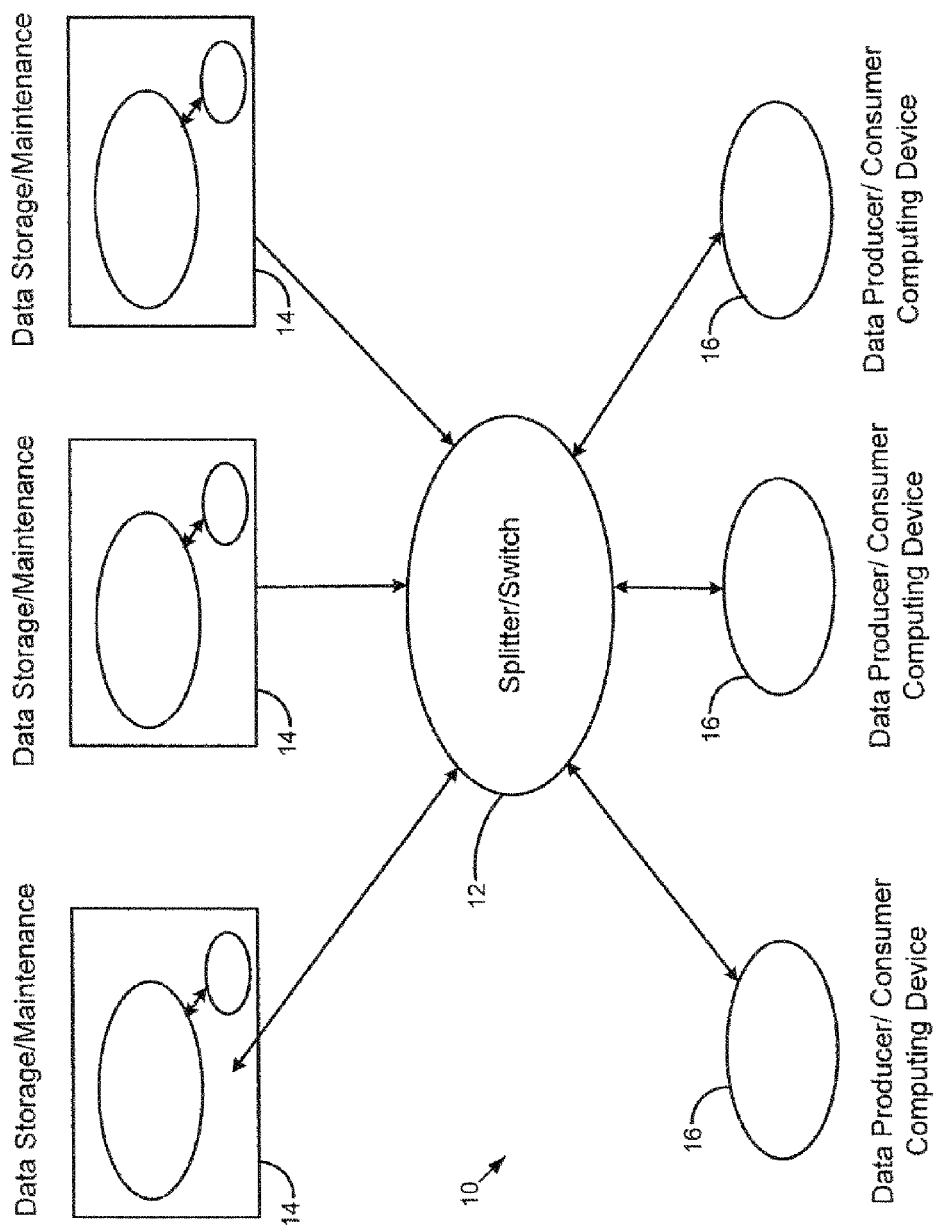
FIG. 1 is a block diagram of a data security system constructed in accordance in accordance with the principles of the present invention.

Referring now to the drawing figures in which like reference designators refer to like elements, there is shown in FIG. 1, a system constructed in accordance with the principles of the present invention and designated generally as "10." System 10 is a data security system and includes a data splitting and switching device 12, which interposes between network storage devices 14 and network computing devices 16. The data/splitter 12 operates to control and monitor the data communication channels or paths between the network storage devices 14 and network computing devices 16. In one embodiment, the data is read and written by the same computer processing unit ("CPU"), for example a CPU of a data producer/consumer computing device 16.

Figure 3:
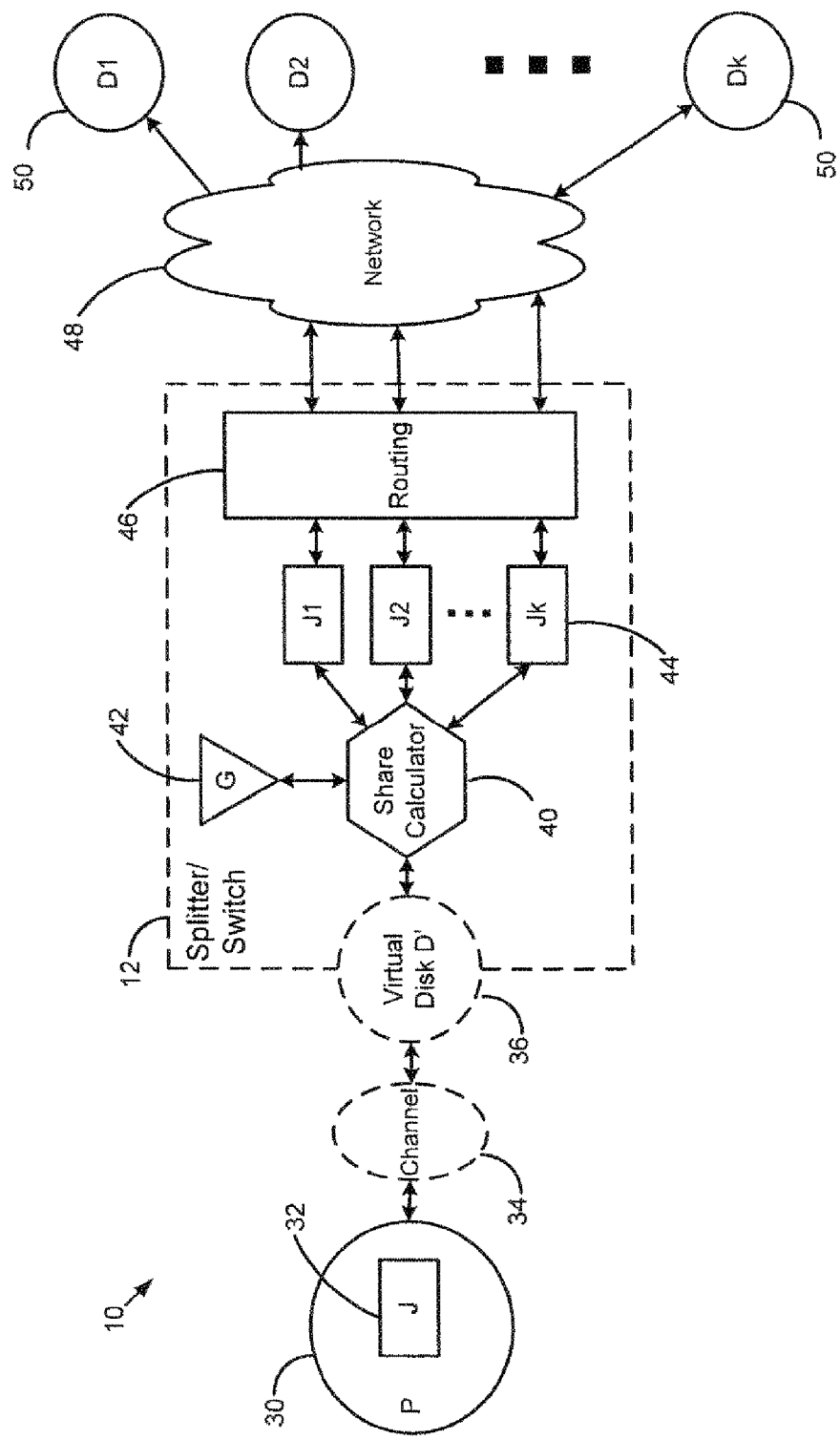
FIG. 3 is a block diagram of still another embodiment of the system of FIG. 1 constructed in accordance with the principles of the present invention.

The data splitter/switch device 12 prepares data for transmission and/or storage by splitting the data and routing the data. The data splitter/switch device 12 also retrieves the data by collecting the data splits and reconstructing the data from the retrieved data splits. The data splitter/switch device 12 can be configured to provide different data splits depending on a virtual destination identifier. For instance, a virtual tape can be created as a destination, which is in effect two tapes at different locations, where each of the receivers is respectively aware of its data share. If all channels were mapped through, or if this were the only device to be handled over the network, a solution specific to the secure, keyless archive of data is provided, and the remainder of the computing infrastructure can remain unchanged. In an embodiment, data splitter/switch device 12 can include a data share calculator 40 (FIG. 3) and a routing component 46 (FIG. 3). The logical flow of data is discussed below in greater detail with respect to FIG. 3.

The network storage devices 14 are mainly used for data storage and maintenance, e.g., backup, cataloging and long-term bulk storage. In an embodiment, the network storage devices 14 can include, but are not limited to, one or more disks, disk arrays, redundant array of independent disks ("RAID"), servers or an equivalent.

Network computing devices 16 are producers and consumers of data. In an embodiment, the computer systems of network computing devices 16 are one or more personal computers ("PCs"), personal digital assistants ("PDAs"), hand-held computers, palm top computers, lap top computers, smart phones, game consoles or any other information processing devices. A personal computer can be one or more IBM or compatible PC workstations running a Microsoft Windows or LINUX operating system, one or more Macintosh computers running a Mac OS operating system, or an equivalent. In another embodiment, the network computing devices 16 are a server system, such as SUN Ultra workstations running a Sun OS operating system or IBM RS/6000 workstations and servers running the AIX operating system.

Figure 2:
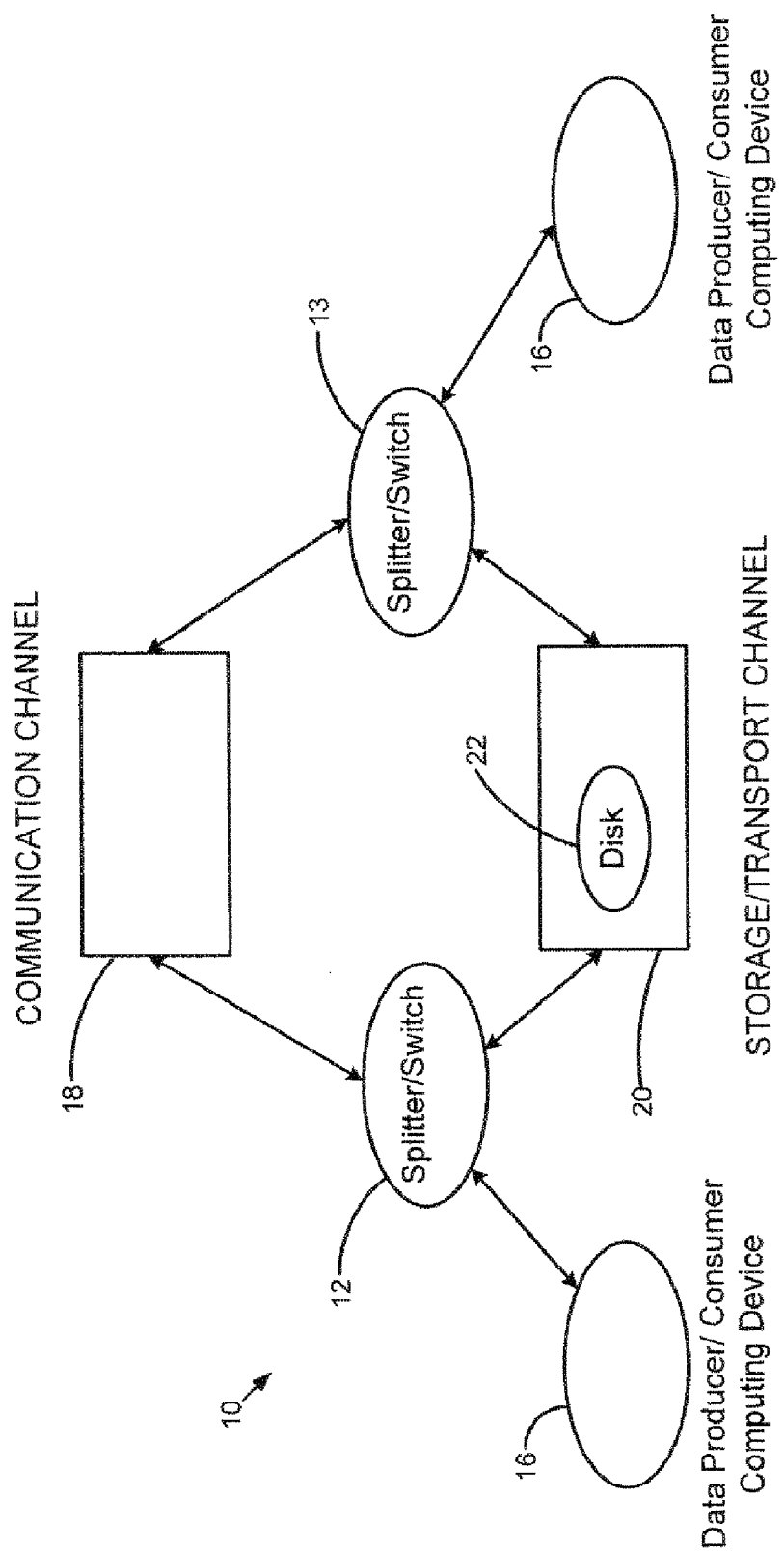
FIG. 2 is a block diagram of another embodiment of the system of FIG. 1 constructed in accordance with the principles of the present invention.

FIG. 2 illustrates an exemplary data security system where there are two different splitter/switch devices 12, 13 that are placed at the ends of communication channels 18 and 20. In an embodiment, channels 18 and 20 can be configured effectively as one-way channels, such that data written into the channel cannot be recovered except at the other end. The upper channel 18 emphasizes the communication aspect of the channel. Data written into the channel 18 can be transported before being stored. The lower channel 20 emphasizes the storage aspect of the channel. Data written into the channel 20 can be stored before being transported. In an embodiment, the data splitter/switch device 12 writes into the network on the upper channel 18 but writes to a storage element 22, e.g., a disk of a computer notebook, on the lower channel 20. The storage element 22 eventually can be physically transported to data splitter/switch device 13 and be joined with the stored data sent over the upper channel 18. The data splitter/switch device 13 can then complete the transport and reconstruct the data. In this manner, the data splitter/switch device 12 provides for the transport and security of the data while the data is stored and/or transported.

Referring to FIG. 3, a logical flow of data through an embodiment of the data splitter/switch device 12 is illustrated. In this embodiment, a processor 30, e.g., a processor of a data producer/consumer computing devices 16, requests to read or write a data block J 32 into a virtual disk or device D' 36. In an embodiment, the channel 34 through which the block J 32 passes can be a hardware interface such as a local bus, for example, an AT Attachment ("ATA") or SCSI bus. In another embodiment, the channel 34 can be a hardware interface capable of switching and non-local delivery, such as Storage Area Network ("SAN") related technology. In another embodiment, the channel 34 can be a software channel, such as software device abstraction, e.g., /dev/hda or a software communication channel abstraction, e.g., a Berkeley Software Distribution ("BSD") socket or the like. The data splitter/switch device 12 is adaptable to interconnect with each of the above communication channels.

The splitter/switch device 12 includes a component to calculate data shares, either to split the data or to reconstruct the data, which may comprise a share calculator 40 and a random number generator 42, which may be a source of high quality random bits. The share calculator 40 is used to calculate any number k of splits, shares or portions of a data block or file. For example, in this embodiment, the data block 32 ("J") may be split into "k" number of splits, shares or portions 44, e.g., J1, J2 ... Jk, for storage or transport. Similarly, when a client or data producer/consumer 16 having the proper authorization to access data block 32 ("J") requests data block J, the share calculator 40 can reconstruct the data block J from the splits, shares or portions 44, e.g., J1, J2, ..., Jk.

The split calculator 40 is configured to provide any reconstruction threshold number "t" of data splits less than or equal to the total number "k" of data splits that are required to determine or reconstruct the original data. In other words, "t" is the number of data splits necessary to reconstruct the original data 32. For example, if threshold t equals 1, the method reduces to a standard redundant array of independent disks ("RAID") mirroring function, which is the copying of data to more than one disk and referred to as "RAID 1". In contrast, if threshold t is greater than 1, the method provides that the individual data splits, shares or portions 44, e.g., J1, J2, ..., Jk are uncorrelated with the original data 32 and are therefore secure. In one embodiment, the encoding of the individual data splits, shares or portions 44, e.g., J1, J2, ..., Jk can be performed by using an exclusive-or summer, or the Rabin method of encoding data in the constant coefficient of a higher order polynomial whose values at the sample points are the individual data splits, shares or portions 44.

When threshold t is 1 less than k, i.e., t=k−1, the method is similar to a standard RAID distributed parity, which requires all but one disk to be present to recover the original data 32 and is referred to as "RAID 5". However, the method of the present invention differs in that the data splits, shares or portions 44 individually, or in any collection of k−1 will be uncorrelated to the original data 32. Another advantage of the method of the present invention is that threshold t can take values other than k−1. In this way, the share calculator 40 provides secrecy by producing data splits, shares or portions 44 that are uncorrelated with the original data 32, if the data splits, shares or portions 44 are taken individually or in any combination where the data splits, shares or portions 44 is a number less than the reconstruction threshold t. For example, in one embodiment, the number of storage devices 50 is ten, e.g., D1, D2 ... D10, and the reconstruction threshold is set at seven. In this example, when the number of retrieved data shares is greater than or equal to the reconstruction threshold of seven, the original data 32 can be properly reconstructed. Otherwise, the retrieved data shares cannot be reconstructed and the retrieved data shares will remain uncorrelated.

For example, the encoding of the individual data splits, shares or portions 44, e.g. J1, J2, . . . , Jk can be performed using a (k, n) threshold scheme. In this embodiment, a prime Q is selected such that the number of bits in its representation exceeds the number of bits in the data shares 44. Random values X1, X2, . . . , Xk are selected uniformly from 1 to Q−1, provided that they are distinct, and are assigned to the k data channels 50, e.g., D1, D2, . . . , Dk. The data shares 46 are retained and can be made public. In one embodiment, the Q and Xi are provided to the end data device Di 50, and can be queried and recalled from the data device 50. A random polynomial $f(x)=a0+a1x+a2x^2+ \ldots +a\{t-1\}x^{\{t-1\}}$ is selected by the share calculator 40. In one embodiment, the random polynomial is subject to the constraint that a0 is equal to the value of the data block 32 to be shared and the remaining coefficients ai are uniformly selected from the integer set 0 to Q−1. The share Ji is the value of the polynomial at Xi, e.g., Ji=f(Xi), where the polynomial arithmetic is calculated modulo Q. After the shares Ji are generated, the share calculator 40 can securely discard the random polynomial.

In an embodiment, a new random polynomial can be chosen by the share calculator 40 for each data block. The new random polynomial is generated securely in the share calculator 40. Reconstruction of the secret by the share calculator 40 commences with the reconstruction of the polynomial f(x). By using t shares from among the k shares J1, J2, . . . , Jk, it is possible to solve the t equations Ji=f(Xi) for the t unknowns a0, a1, . . . , a{t−1}. From the reconstructed polynomial f(x), the value of a0 is the original data 32 that was shared.

In other embodiments of share calculator 40, other methods of data sharing can be used. These other methods of data sharing are equivalent when known values are generated and assigned to data channels, random and unknown values are generated within the secure splitter/switch 12, the value of the data shares 44 are dependent on and calculated from both the known and unknown values, the random and unknown values generated with the secure splitter/switch 12 can be disposed, and the shared data 32 can be recovered by the presentation in sufficient quantity of data shares 44 along with the assigned known values.

The random number generator 42 generates a high quality of random bits for use by the share calculator 40 in its cryptographic or encoding process. Although random number generator 42 can be a pseudo random generator that is incorporated into software, a preferred embodiment utilizes a "true" random number generator that relies on the unpredictable quantum process of photon emission.

In an embodiment, the shares or portions 44 of the data block are routed by routing component 46 and encapsulated into the networking protocols so that each share or portion 44, e.g., J1, J2 . . . Jk, is delivered or retrieved via network 48 to/from data storage devices 50, e.g., D1, D2 . . . Dk. With each block of data to write, for example the data block 32, the splitter/switch device 12 may generate k−1 blocks or portions of random data J1, J2 . . . J(k−1). The last portion, Jk, may be chosen so that the "exclusive or" operator applied to all n portions will equal data block J.

In this embodiment, the routing component 46 advantageously routes the shares or portions 44 of the data block across networks having different protocols. For example, channel 34 can be an Ethernet network and network 48 can be an ATM network. The routing component 46 can "interwork" the Ethernet network 34 and the ATM network 48 to permit the data from one network to pass to the other and vice versa without the need for the data source to account for the protocol of the data destination. Upon receipt of an information frame from the source, e.g., channel 34, the routing component 46 forms a second frame of a format compatible with the destination network, e.g., network 48 and including the information payload, e.g., Ji splits, from the first frame. The routing component 46 also maps the destination address incorporated in the origin frame to a corresponding destination address of a format compatible with the destination network to facilitate forwarding of the second frame to the destination for storage or transport.

Of note, although the term "router" or "routing" is used herein to refer to the routing component used to transport data and/or route information within and between data producer/consumer computing devices 16 and data storage devices 50, it is readily understood by one of ordinary skill in the art that the present invention is not limited to such. Accordingly, the term "router" as used herein, can refer to any switching network element, such as a switch, router or any other computing device, such that the present invention is not limited to the use of routers in the traditional sense. Put another way, the term "router" is used merely for convenience herein and is not intended to limit the present invention to only traditional routing platforms.

Routing component 46 can include suitable hardware and software to enable it to perform the functions described herein with respect to the present invention. For example, routing component 46 can include a central processing unit, volatile and non-volatile memory and storage devices, network interfaces and processors as well as other I/O interfaces to enable configuration.

In an embodiment, the data storage devices 50 can be block read write devices, e.g., disk storage or redundant array of independent ("RAID") collections of disk storage. In another embodiment, the data storage devices 50 can be a communication channel write only at one end, read/write at the other, so that the data is written securely over a diversity of channels and is reconstructed for read and read/write at another end by a distinct computing facility. In another embodiment, the data storage devices 50 can be a communication channel which is modally write only and read only, such as a remote tape drive which is write only for backup and read only for recovery.

For data retrieval, the routing component 46 recovers the data splits, shares or portions 44 from the storage devices 50 and sends the recovered data splits, shares or portions 44 to the share calculator 40 for reconstruction of the original data 32. Reconstruction of the original data 32 can proceed if at least the threshold t number of data splits, shares or portions 44 is recovered. Otherwise, the data splits, shares or portions 44 will remain uncorrelated and reconstruction of the original data 32 will fail.

The present invention advantageously provides and defines a comprehensive system and method for data security against unauthorized users. The present invention further advantageously provides a data security device that operates in a transparent fashion to one or more client devices and one or more storage systems of one or more networks.

The present invention can be realized in hardware, software, or a combination of hardware and software. An implementation of the method and system of the present invention can be realized in a centralized fashion in one computing system or in a distributed fashion where different elements are spread across several interconnected computing systems. Any kind of computing system, or other apparatus adapted for carrying out the methods described herein, is suited to perform the functions described herein.

A typical combination of hardware and software could be a specialized or general-purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

It will be appreciated by persons skilled in the art that the present invention is not limited to what has been particularly shown and described herein above. A variety of modifications and variations are possible in light of the above teachings without departing from the spirit or essential attributes thereof, and accordingly, reference should be had to the following claims, rather than to the foregoing specification, as indicating the scope of the of the invention.

What is claimed is:

1. An apparatus for data security, the apparatus comprising:
a random number generator generating random numbers;
a share calculator in communication with the random number generator, the share calculator selecting a random polynomial to generate one or more encoded data shares based at least in part on the random numbers;
the share calculator encoding based at least in part on a Rabin polynomial model that encodes client data in at least one constant coefficient of the random polynomial;
the share calculator discarding the random polynomial after generating the one or more encoded data shares; and
the share calculator constructing a second random polynomial based on the one or more encoded data shares, the second random polynomial being used to reconstruct client data.

2. The apparatus of claim 1, further comprising a router in communication with the share calculator, the router routing the one or more encoded data shares.

3. A data security system, the system comprising:
one or more storage devices, the one or more storage devices storing client data;
a share calculator, the share calculator providing access to the client data stored on the one or more storage devices, the share calculator selecting a random polynomial to encode at least a portion of the client data that is stored on the one or more storage devices;
the share calculator encoding based at least in part on a Rabin polynomial model that encodes the at least the portion of the client data in at least one constant coefficient of the random polynomial;
the share calculator discarding the random polynomial after encoding at least a portion of the client data that is stored on the one or more storage devices; and
the share calculator constructing a second random polynomial based on the encoded client data, the second random polynomial being used to reconstruct the client data.

4. The system of claim 3, wherein the share calculator is located on a network path between one or more client devices and the one or more storage devices.

5. The system of claim 3, wherein the share calculator communicates encoded client data sent from one or more client devices to the one or more storage devices.

6. A method for securing data in storage devices on a network, the method comprising:
generating at least one random number;
selecting a random polynomial based in part on the at least one random number;
encoding at least a portion of the data to generate encoded data shares, the encoding being based at least in part on the random polynomial and a Rabin polynomial model that encodes the at least the portion of the data in at least one constant coefficient of the random polynomial;
discarding the random polynomial after generating the encoded data shares;
storing the encoded data shares in a plurality of data storage devices, the plurality of data storage devices being non-transitory storage devices; and
constructing a second random polynomial based on the encoded data shares, the second random polynomial being used to reconstruct the at least the portion of the data.

7. The method for securing data of claim 6, further comprising:
routing the encoded data shares to the plurality of data storage devices.

8. The method for securing data of claim 6, further comprising:
providing access to the stored encoded data shares.

9. The method for securing data of claim 6, further comprising:
providing access to a network path between one or more client devices and the plurality of data storage devices.

10. The method for securing data of claim 6, further including:
determining a number of encoded data shares based on a number of available storage devices for receiving the encoded data shares;
retrieving a plurality of the stored encoded data shares from the storage devices; and
comparing the number of retrieved stored encoded data shares to a preset reconstruction threshold factor, the preset reconstruction threshold factor indicating each of the retrieved stored encoded data shares are uncorrelated with the at least a portion of the data when the number of retrieved stored encoded data shares is less than the preset reconstruction threshold factor.

11. The method for securing data of claim 10, further comprising accepting a data reconstruction of the plurality of the stored encoded data shares conditioned upon the number of retrieved stored encoded data shares being greater than the preset reconstruction threshold factor.

12. The method for securing data of claim 6, further comprising:
transporting encoded data shares along a first communication path of a network; and
storing a portion of the encoded data shares along a second communication path of the network.

13. The method for securing data of claim 12, wherein the storing a portion of the encoded data shares along a second path of the network includes storage in a physically detachable storage device.

14. The method for securing data of claim 12, further comprising using a second splitter to decode the encoded data shares that are stored on the one or more storage devices.

* * * * *